Feb. 4, 1964    A. HOROWITZ    3,120,279
ROTARY SPADING MACHINE
Filed Nov. 19, 1954    7 Sheets-Sheet 1

INVENTOR
ALEXANDRE HOROWITZ
BY
ATTORNEYS

Feb. 4, 1964  A. HOROWITZ  3,120,279
ROTARY SPADING MACHINE
Filed Nov. 19, 1954  7 Sheets-Sheet 5

INVENTOR
ALEXANDRE HOROWITZ
BY
ATTORNEYS

Feb. 4, 1964 A. HOROWITZ 3,120,279
ROTARY SPADING MACHINE
Filed Nov. 19, 1954 7 Sheets-Sheet 6

INVENTOR
ALEXANDRE HOROWITZ

BY Toulmin & Toulmin

ATTORNEYS 3,120,279
Patented Feb. 4, 1964

3,120,279
ROTARY SPADING MACHINE
Alexandre Horowitz, Amersfoort, Netherlands, assignor to N.V. Ontwikkelingmaatschappij Multinorm, Amersfoort, Netherlands, a corporation of Netherlands
Filed Nov. 19, 1954, Ser. No. 470,086
Claims priority, application Netherlands Nov. 24, 1953
7 Claims. (Cl. 172—95)

This invention relates to a machine for cultivating the soil, and more particularly to an automotive machine of universal application for ploughing, digging, sieving, and other soil working operations.

The operations of ploughing, digging, and the like were hitherto carried out by various agricultural machinery, ploughing, for instance, by means of a ploughshare being drawn through the soil. This has several disadvantages, one of them being a substantial consumption of power. Another disadvantage results from the fact that in certain types of soil, for instance in heavy clay, when using a ploughshare, long lump pieces of soil are wholly or partly turned and deposited in long strips, instead of cutting these long strips up in smaller pieces. Another disadvantage is the tendency of the tractor to slide over the soil due to the heavy resistance of the ploughshare. As a further disadvantage a ploughshare often tends to clog the bottom of the furrow made by it, which clogging results in a diminished permeability, thus causing an undesirable reduction of capillary action and hindering the plant roots from growing down to the desired depth. Therefore, especially in gardening, tilling has often to be done by hand, for instance with a spade.

It is an object of this invention to provide a machine for tilling the soil which will avoid all the above-mentioned disadvantages.

It is a further object of this invention to provide a machine for the aforesaid purposes having a plurality of shovel means or blades radially arranged around a shaft (forming a shovel-bearing wheel means) wherein the shovel means carry out a cycloidal movement during the forward movement of the machine across a field or acre of land.

Machines of the aforesaid type have thus far only been used in agriculture in connection with potato planting.

It is a further object of the invention to provide a machine for tilling the soil wherein the cross section of each shovel means taken in a plane perpendicular to the shaft is of such shape as to present a single profile of the involute type, developed in the direction of rotation.

It is yet another object of this invention to provide a soil cultivating machine wherein friction of the shovel means against the solid soil in front of the cultivating machine can be reduced.

Since an involute may be generated by a point in a straight line which is rolled on a fixed circle, the latter shall henceforth be referred to as the "base circle" for the involute profile of the shovel means according to the invention.

Since cycloids of different types are generated by a point in, inside or outside the circumference of a circle which rolls along a straight line, the latter circle as referred to when describing the cycloidal movement of the shovel-bearing part of the machine shall henceforth be called the "generating circle."

This generating circle is a circle which makes a rolling movement over the surface without slipping. Normally, when a wheel rolls over the surface, the generating circle corresponds with the outer circumference of the wheel which is in contact with the surface. If, however, the rotation of the wheel is somewhat greater than would correspond with the correct rolling (without slipping) over the surface, this means that the radius of the generating circle is somewhat reduced so that the wheel in question may be considered to roll over a hypothetical surface which lies closer to the axis of the wheel than the surface in contact with the outer circumference of the wheel.

Figure 4A:
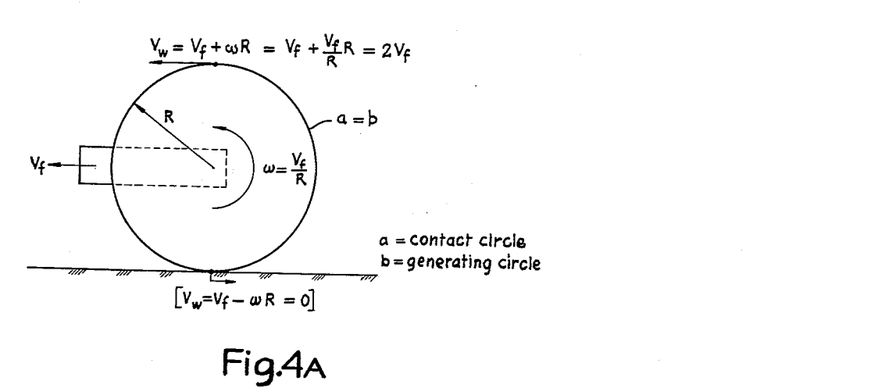
FIGURES 4A and 4B are diagrams illustrating vectorially the relationships when the shovel wheel structure rotates at different speeds with respect to the ground surface.
Figure 4B:
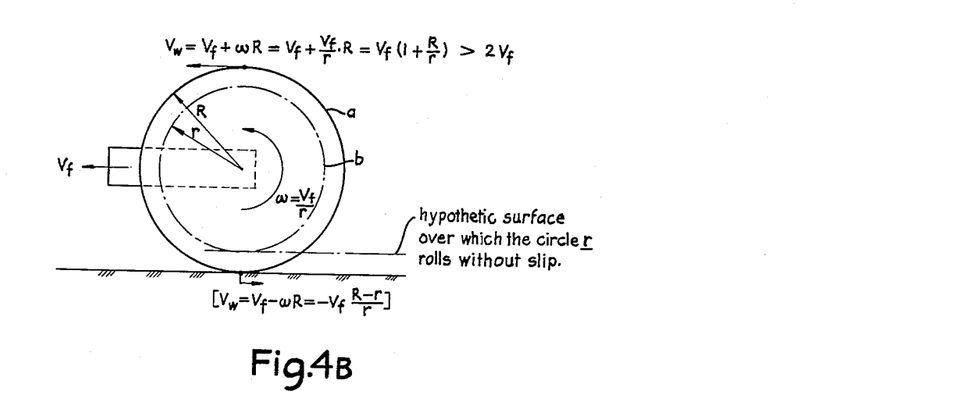

This picture may be further clarified by reference to FIGURES 4A and 4B where FIGURE 4A illustrates the situation wherein the wheel rolls without slipping over the surface. $V_f$ equals the forward velocity of the vehicle, $V_w$ equals the velocity at the circumference of the wheel relative to the surface, and $w$ equals the angular velocity of the wheel.

It is noted that the velocity of the circumference of the wheel at the lowest point of the wheel is zero which means that there is rolling without slipping.

In FIGURE 4B, a situation is shown in which the angular velocity of the wheel is somewhat greater than would correspond with the correct rolling (without slipping) over the surface. It is noted that the velocity of the outer circumference of the wheel with respect to the surface at the lowest point of the wheel is no longer zero but has a small negative value. It can be further appreciated that udner these circumstances the correct rolling occurs on a hypothetical surface which is at a shorter distance to the axis of the wheel dependent upon the increase in annular velocity of the wheel with respect to the situation shown in FIGURE 4A.

FIGURE 4B illustrates the situation which actually prevails in the equipment according to the present application. In view of this slipping of the wheel, geometrically speaking, the radius of the generating circle is somewhat smaller than the radius of the contact circle.

When the machine moves forward, each shovel means in turn penetrates into the soil at a certain place, then shovelling up the soil and turning the shovel load in the same way as it would be done manually with a spade. When moving across the field to be cultivated, each shovel will penetrate at a certain point. The points on the shovels, which merely touch the surface of the earth without penetrating into the same, are positioned on a circle henceforth referred to as the "contact circle."

Reduction of friction of the shovel means against the soil to be cultivated is achieved by adjusting the ratio of the rotational speed of the shovel-bearing wheel means of the cultivating machine and the speed of forward movement of the machine across the field, so that the "generating circle" of the cycloidal movement of the shovel means is not larger, and preferably smaller than the aforesaid "contact circle."

The speed of rotation of the shovel-bearing wheel means and the forward speed of the whole machine determine the diameter of the "generating circle." At increased speed of the rotational movement of the shovel-bearing wheel means the shovel means will touch the soil in more rapid succession, and therefore the slices of shoveled-up soil will be thinner. Thinner slices of soil are easier to unload because they cannot stick between two adjacent shovel blades.

Furthermore it is of special advantage to devise the radius of the generating circle smaller than the radius of the contact circle, because, when moving through the soil, the shovel means move in a direction contrary to that of the forward movement of the machine, thus loosening the shovels from the soil in front of the machine thereby reducing friction.

It was also found to be of advantage if the base circle of the involute cross section of the shovel means is not smaller than the generating circle, but preferably larger than the same, and if it is not larger but preferably smaller than the contact circle, as has been explained above.

The desired advantages of less friction and easier unloading of the shoveled-up slices of earth can be obtained in different ways, depending upon whether the forward movement of the machine is caused by self-propulsion of the shovel-bearing wheel or whether the machine is driven by other means, such as, for instance, a tractor.

If, for instance, the forward movement of the machine is caused by self-propulsion of the shovel-bearing wheel means, the speed of the machine, as compared with the resulting rotation speed of the shovel-bearing wheel, can be slowed down by applying a suitable braking device. Thereby the radius of the generating circle of the cycloidal movement will be diminished adapting the same to the character of the soil and resulting in thinner slices of soil being shoveled up.

Furthermore drive means can be provided for effecting the linear forward movement of the machine and the rotation of the shovel-bearing wheel simultaneously from the same engine or motor, but in such a way that the shovel-bearing wheel turns somewhat faster than with that speed of rotation which would correspond to the linear forward movement of the machine as applied at that instant.

The shaft of the shovel-bearing wheel is situated substantially at a right angle to the direction of movement of the machine. Thus, a strip of soil is covered whose width corresponds to the width of the shovel means. The width of this strip which is to be covered in one running can be enlarged by placing the shaft of the shovel-bearing wheel at an angle which differs from 90 degrees with regard to the direction of movement.

The soil that has been shoveled up has to be unloaded from the shovel means. If the latter consist of blades, these may be arranged around the shaft in helicoidal manner, the pitch of the helicoidal plane being so chosen as to facilitate the sliding-off of the shoveled-up soil from the blades.

The sliding-off of the soil from the blades may further be facilitated by constantly moistening the latter. In order to achieve an equal load on the motor or other driving means, the shovel means are to be placed preferably so that when one blade has completely entered into the soil, approximately at the same time the next one begins penetrating the same.

A different manner of facilitating the unloading of shoveled-up slices of soil consists in using turnable or tiltable shovels. If it is intended to deposit the shoveled-up soil into the freshly dug furrow or beside it, it will be of advantage to place the axes of the turning shafts of the shovel means substantially in one or several planes at right angle to the main shaft.

It is furthermore of advantage to arrange the turning shafts of the shovel means at or near one side of the base of the latter. It is thereby possible to turn each shovel while it is lifting each slice of soil out of the ground, so that each shovel deposits its slice of soil into or next to the freshly dug furrow. Shifting means have been provided for carrying out the necessary adjustment of the turning shafts.

In a different embodiment according to the invention the shovel means are arranged substantially along the lines describing the surface of a cylinder coaxial with the main shaft, openings being provided in the aforesaid cylindrical surface through which the shoveled-up earth can pass. This arrangement is particularly favorable when the machine is to be used simultaneously for sieving the soil, for, if such is the case, a sieving device may be mounted inside the aforesaid cylinder, through which the shoveled-up soil will pass when being returned to the ground.

This invention will be more clearly understood upon reference to the following specification, taken in connection with the accompanying drawings, wherein.

Figure 1:
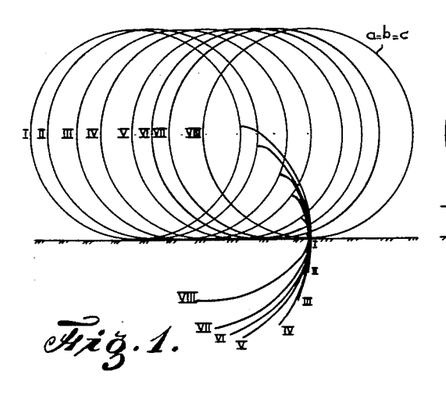
FIGS. 1 to 3 represent diagrams showing the cycloidal movement of the shovel means and the involute shape of the latter.

Referring to the drawings somewhat more in detail, the diagram of FIG. 1 reveals the principle of the invention in its simplest form as viewed in a plane perpendicular to the main shaft. The generating circle $b$ of the cycloidal movement has, in this figure, the same radius as the base circle $c$ from which the involute cross section of the shovel means is deducted. In FIG. 1 the generating circle $b$ also has the same radius as the contact circle $a$, i.e. the circle described by those points of the shovel means which just touch the ground during operation, the radius of this circle being the shortest distance from the axle of the shovel-bearing wheel to the ground. The generating circle, the base circle and the contact circle are therefore identical in FIG. 1. The generating circle $b$ is shown in 8 different positions together with the corresponding positions adopted each time by one single shovel means. Each point of the shovel means follows a cycloidal curve.

In position I the tip of the shovel just touches the ground. In position VIII the shovel has reached its maximum length of penetration into the ground, i.e. since $b$ equals $c$, it must be completely buried. The point of the shovel which is situated at the surface of the soil at each instance operates as the pivoting point of the shovel during its turning inside the soil. The real shoveling-up action of the shovel means only begins after the shovel has reached its greatest depth of penetration into the soil, which corresponds to position V, and is not identical with the greatest length of penetration of the shovel.

Figure 2:
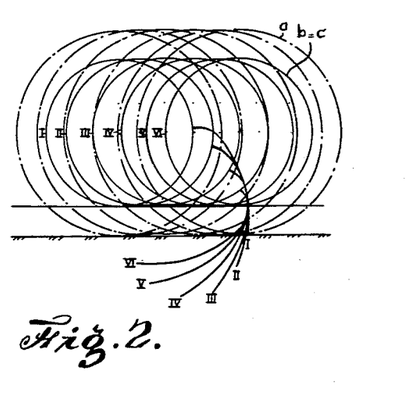

FIG. 2 shows the various positions I to VIII of a shovel means carrying out a cycloidal movement, whose generating circle $b$ is of smaller radius than the contact circle $a$. The base circle $c$ of the involute is of the same radius as the generating circle $b$.

Figure 3:
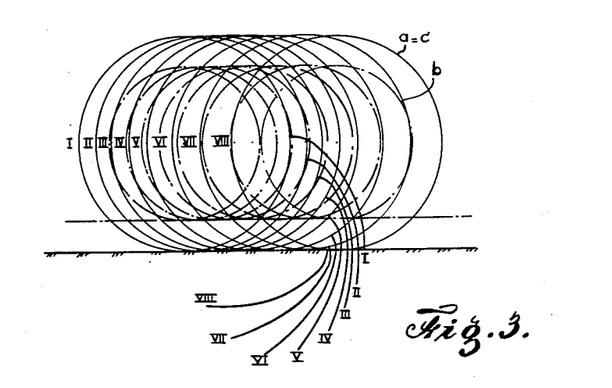

In FIG. 3 the generating circle $b$ is also of a radius smaller than the contact circle $a$. The base circle $c$ of the involute, however, has the same radius as the contact circle $a$.

In both cases, that of FIG. 2 as well as that of FIG. 3, there results a retracting movement of the shovel means in the soil. This provides for thinner slices of soil being shoveled up, so that the portions of soil cannot stick between two adjacent shovel blades. The retracting action also tends to withdraw the convex side of the shovel means from the solid soil in front thereof, thus reducing friction.

It was found that FIG. 3, wherein the base circle $c$ is larger than the generating circle $b$, and identical with the contact circle, is the most advantageous solution for putting the embodiments described hereinafter into practice.

Manufacturing of the shovel means can be facilitated greatly by giving them an approximately involute shape through composing them of parts of circular and straight cross section.

In order to maintain the bottom of the furrow being formed in a straight line parallel to the surface of the earth it is advantageous to provide shovel means of such length and in such number that tips of adjacent shovels described cycloidal curves which overlap each other inside the soil, thereby excavating a furrow whose bottom is of approximately even depth throughout the whole length of the furrow.

Figure 5:
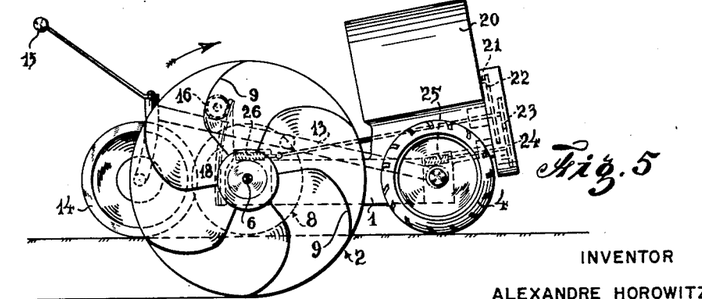
FIG. 5 is an elevational view of the machine according to the invention.
Figure 6:
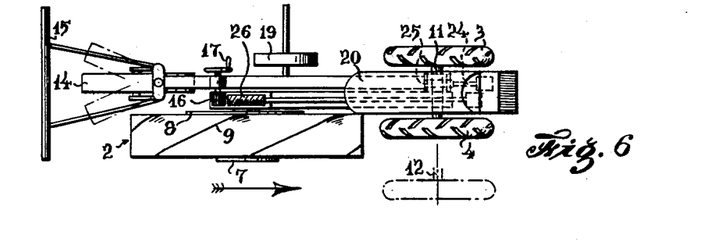
FIG. 6 is a top view of the same machine.

FIGURES 5 and 6 show an embodiment of the machine according to the invention to be used as a plough. It consists of a machine body 1 wherein the shovel-bearing wheel 2 is mounted toward the back end thereof, while the propelling wheels 3 and 4 are mounted inside the body toward the front end thereof.

Figures 11, 12, 13:
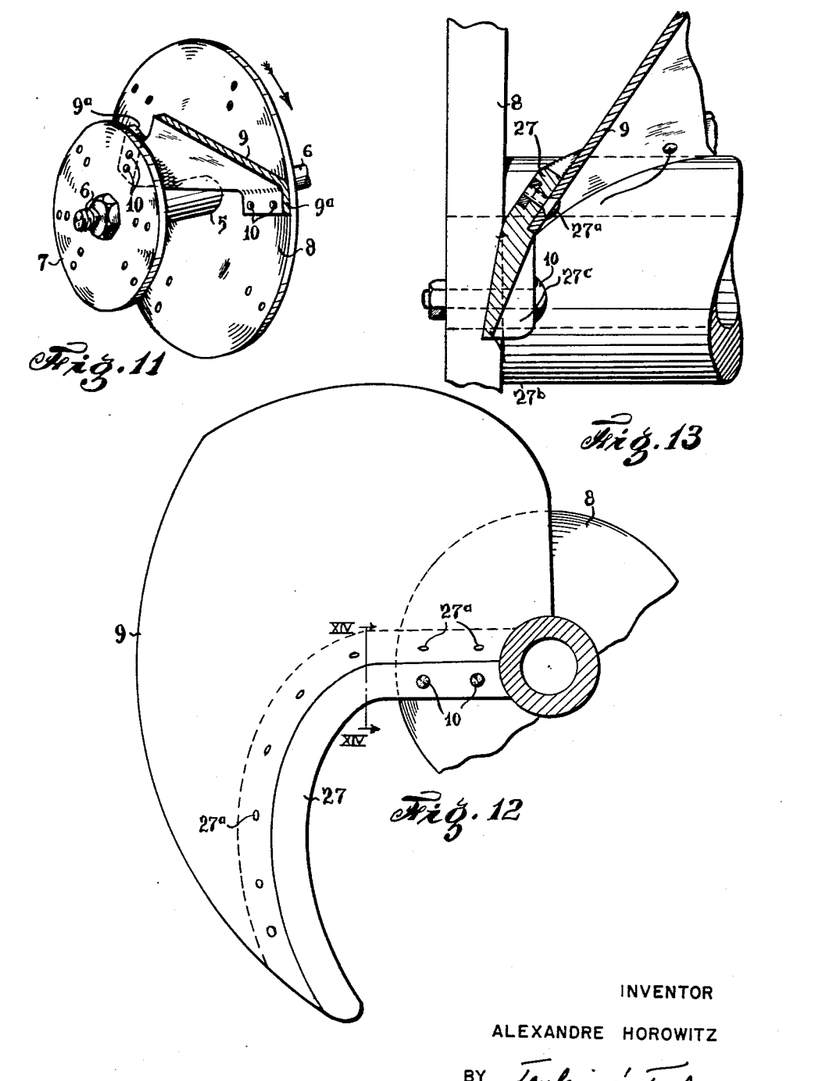
FIG. 11 shows in perspective view one arrangement of a helicoidal shovel blade on the shovel-bearing wheel, in partial section.
FIG. 12 shows the concave or shoveling side of a specially reinforced shovel blade for use in the machine according to the invention mounted in another way.
FIG. 13 shows a partial section of the blade according to FIG. 12.

The construction of the shovel-bearing wheel 2 is shown in greater detail in FIG. 11. On the shaft 6 which is pivotally mounted in the aforesaid body 1, there is mounted a hub 5 which is provided at both ends with round flanges 7 and 8. The shovels 9 are fastened between the two flanges by means of projecting portions 9a and bolts 10. The diameter of flange 7 is kept smaller than the one of flange 8 so that the shoveled-up earth may easily slide off the helically shaped shovel plates. The diameter of flange 8 is approximately equal to that of the contact circle.

As is revealed in FIG. 12, one edge of the shovel plate near its tip is reinforced in order to resist the impact of heavy loads and to prevent distortions of the shovel means when penetrating into the soil.

This reinforcement may, for instance, consist of a sickle-shaped strip 27 which may be fastened to the edge of the shovel plate 9 for instance by means of a number of sunken bolts 27a. This reinforcing strip 27 is sharpened along the cutting edge 27b which penetrates into the soil, as is shown in FIG. 13. The back of this strip is so shaped as to diminish friction. The thick part of the strip 27c is used for fastening the shovel plate 9 to flange 8 by means of bolts 10.

It is possible to further reinforce the shovel plate by mounting special supports (not shown) between the back of the shovel plate 9 and flange 8.

Propulsion of the machine is effected by driving wheel 3 alone. Wheel 3 is rigidly mounted on the hollow shaft 11 which in turn is rotatably mounted in machine body 1. The extractable shaft 12 is arranged inside the hollow shaft 11 so that the other supporting wheel 4 may turn freely.

A frame 13 is hinged to the hollow shaft 11 and carries a freely rotatable rear wheel 14 to which the steering handle 15 is attached. The position of the shaft of the rear wheel 14 is behind shaft 6 or shovel 2, viewed in the direction of forward movement. Frame 13 also carries pinion 16 with handle 17. This pinion cooperates with a rack 18 which is attached to the machine body 1 near shaft 6. The back end of the body together with the shovel-bearing wheel 2 can be lifted or lowered by rotating said pinion 16. A ratchet (not shown) cooperating with gear 16 may lock the body 1 in working position.

When the shovel-bearing wheel 2 is lifted, the plough can move freely, since the shovel-bearing wheel does then not touch the ground. The freely rotatable supporting wheel 4 will be pulled somewhat sidewards, as indicated in the dash- and dotted line in FIG. 6, because the shovel-bearing wheel 2 is placed outside the center line of the machine. A balance of forces can also be obtained by using two adjustable supporting wheels. Another way of keeping the machine in equilibrium is by using a counterweight 19.

The driving wheel 3 is driven by the motor 20 located at the front of the machine and mounted on the body 1. Power from the engine shaft 21 is transmitted to shaft 24 through gear means 22 and 23. Shaft 24 transmits power to the hollow shaft 11 by way of a worm 25. The driving wheel 3 driven in the aforesaid way determines the forward speed of the machine. The shovel-bearing wheel 2 is driven by gear means 22 through worm 26. The ratios of the various speeds are chosen in such way that when the driving wheel 3 is rolling on the soil surface, the speed at the bottom of the contact circle $a$ of the shovel-bearing wheel 2 is small but in opposite direction to the forward movement of the machine.

The following example is given to explain the aforesaid:

| | |
|---|---|
| Speed of motor 20 | 3000 rev./min. |
| Gear ratio 22 | 1:5. |
| Gear ratio 23 | 4:5. |
| Worm ratio 25 | 1:20. |
| Worm ratio 26 | 1:20. |
| Diameter of driving wheel 3 | 24". |
| Diameter of contact circle of the shovel-bearing wheel 2 | 24". |
| Speed of the machine | 3 ft./sec.=2 m./h. |

The various dimensions and speeds have to be selected in such way that the speed of the outer circumference of the shovel-bearing wheel does not become too large, because otherwise the earth is thrown out too far under the effect of the centrifugal force of the shovel-bearing wheel.

The machine is operated as follows:

During the transfer of the machine to the land to be cultivated, gear 22 is disconnected from worm 26. The body 1 is raised, so that the soil-cutting device does not touch the ground. Engine 20 propels the driving wheel 3. When ploughing starts, gear 23 is disconnected from worm 25 and the driving wheels (one or both) are locked; then gear 22 is shifted into engagement with worm 26 and the ratchet of gear 16 is disengaged. Motor 20 now only drives the shovel-bearing wheel 2. The shovel-bearing wheel 2 digs into the ground until its deepest point of penetration has been reached. This depth is controlled either by bearing flange 8 on one side of the shovel-bearing wheel, or by laterally protruding elements (not shown) attached to the shovel means, or through a limiting connection between the body 1 and frame 13. After the shovel-bearing wheel has penetrated into the ground, the driving wheels are released and gear 23 is again connected to worm 25. Then the real ploughing begins. The machine is steered by the steering handle 15. During the movement of the machine the shoveled-up earth is sliding downwardly and laterally off the helicoidally shaped blades 9 and will to some extent be deposited backward of the machine as a result of centrifugal force. Thereby the shoveled-up slices of soil are deposited in a more or less inverted position, depending on the prevailing working conditions.

Figure 7:
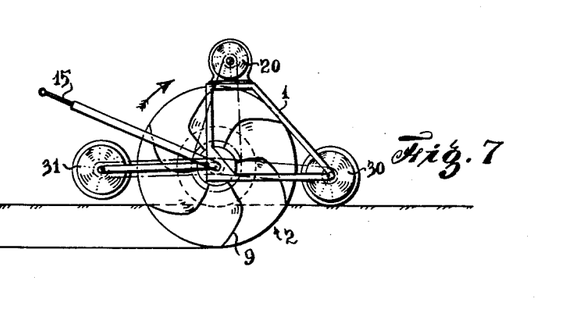
FIG. 7 is an elevational view of a different embodiment of the machine according to the invention.
Figure 8:
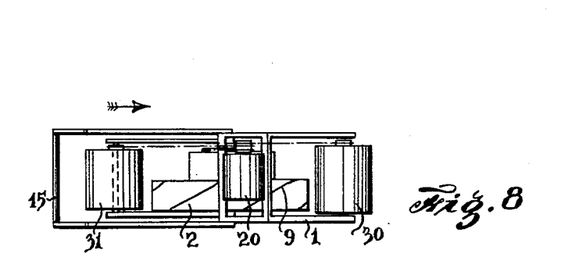
FIG. 8 is a top view of the embodiment shown in FIG. 7.

FIGS. 7 and 8 show a machine body 1 and a shovel-bearing wheel 2 with a front supporting wheel 30 and an upwardly and downwardly displaceable supporting wheel 31. The shovel-bearing wheel can be lifted or lowered into the soil with the aid of said wheel 31. The wheel 30 and the shovel-bearing wheel 2 are driven in the same way as in the embodiment according to FIGS. 5 and 6.

Figures 9, 10, 14, 15:
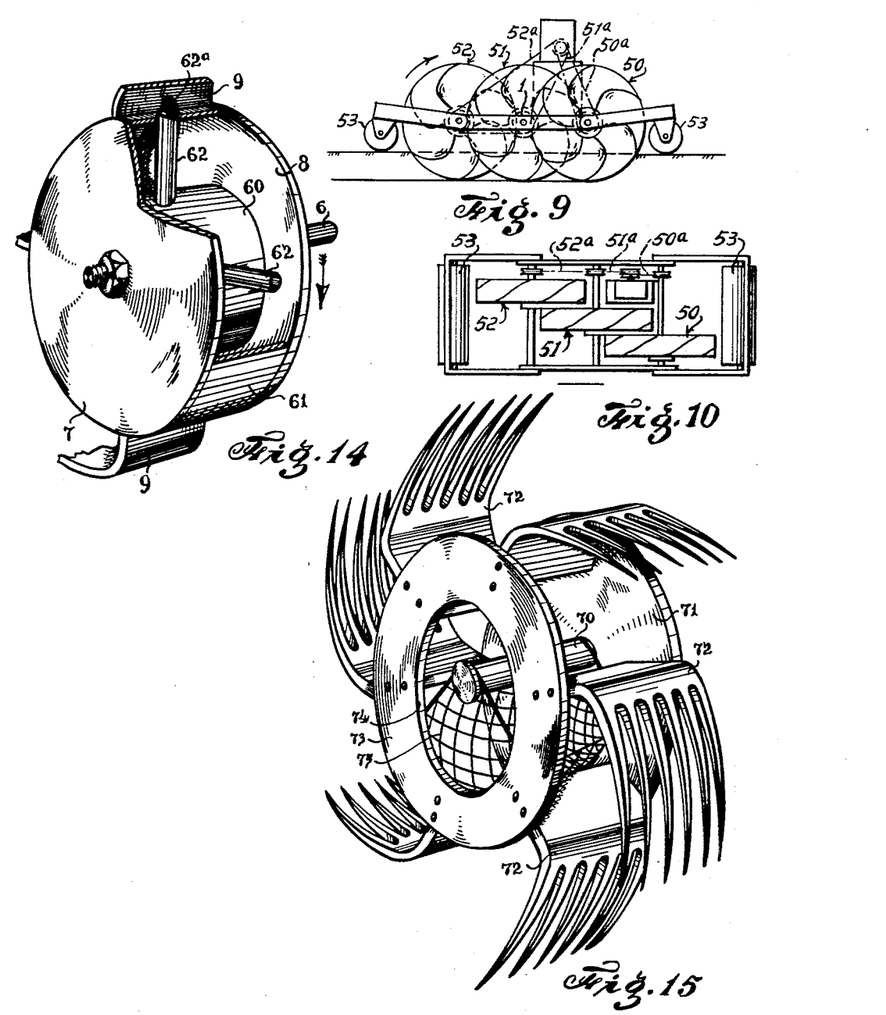
FIG. 9 is an elevational view of the machine according to the invention in an embodiment as a multi-cutter, combining a plough and a harrow.
FIG. 10 is a top view of the embodiment shown in FIG. 9.
FIG. 14 shows a perspective view of one embodiment of a shovel-bearing wheel having tiltable shovel blades whose casing has been partly cut open.
FIG. 15 shows a perspective view of the machine according to the invention in an embodiment as a sieving device.

A multi-plough is shown in FIGS. 9 and 10. The body 1 carries three shovel-bearing wheels 50, 51, and 52 mounted in corresponding bearings and driven by chains, 50a, 51a, and 52a. Through the staggered position of the shovel-bearing wheels a compact and space-saving construction is obtained which allows to plough a wider track. The shovel-bearing wheel 52 in the back part deposits the shoveled-up soil in the furrow of wheel 51 and this one in turn deposits its soil in the furrow of wheel 50. The body 1 is provided on both sides with supporting wheels 53, which may lift or lower the body, thus varying the height of the shovel-bearing wheels above the ground similar to the embodiment in FIGS. 7 and 8. Of course, a seat for the driver may be provided on top of the plough.

All hitherto described embodiments are designed as ploughs showing helicoidal-shaped shovel blades. Shovel blades may also be used, which are not of helicoidal shape, but whose base is parallel with the axis of the shovel-bearing wheel. If it is necessary to deposit the shoveled-up soil laterally or directly into the freshly ploughed furrow, the shovel-bearing blades can be operated through a device which makes them turn or tilt. One example of such an embodiment is shown in FIG. 14. The coaxial cylinders 60 and 61 are fastened between two flanges 7 and 8. A number of holders 62 is placed radially between the cylinders. A blade shaft 62a is attached to the bottom of the shovel blades which shaft fits in the holder 62. A mechanism is placed inside cylinder 60 which turns or tilts the shovel blades at the desired moment through said blade shafts.

It is advantageous under certain circumstances to place these holders not radially to the main shaft but to let them cross the main shaft. This means that the blade shafts remain in one or more planes perpendicular to the main shaft 5 but that the axes of the blade shafts do not intersect the centerline of the main shaft. Said blade shafts can be fastened at the center line or at either side of the shovel means. Both arrangements will facilitate the depositing of the shoveled-up soil directly into the freshly ploughed furrow. To this end it is essential that the shovel blade be turned at the right moment.

Another example of an embodiment having tiltable blades is shown in the FIGURES 19–22. Herein a plough is shown having several adjacent sets of shovel means, each comprising four tiltable blades. Each blade 9 is fixed on a curved support 90, said supports being rotatably mounted on a casing 91. These casings are mounted around a cylindrical hub 92 which is coaxial with the main shaft 5. In the casings 91 the mechanism for tilting the blades 9 on the appropriate moment is enclosed. From FIG. 19 will be seen that a shovel blade may be fixed at its center line to the tiltable support 90 (full lines) or at one side of it (dash and dotted lines). The adjacent casings are angularly displaced with respect to each other. This causes a more uniform load on the motor as the shovel blades each penetrate into the soil at different moments. Further it facilitates the tilting movement of the blades as the displacement of one blade is not hindered by a blade in an adjacent set of blades. FIG. 23 shows a diagram of the ploughing scheme with a machine having five adjacent sets of tiltable blades.

Figures 19, 20, 21, 22, 23:
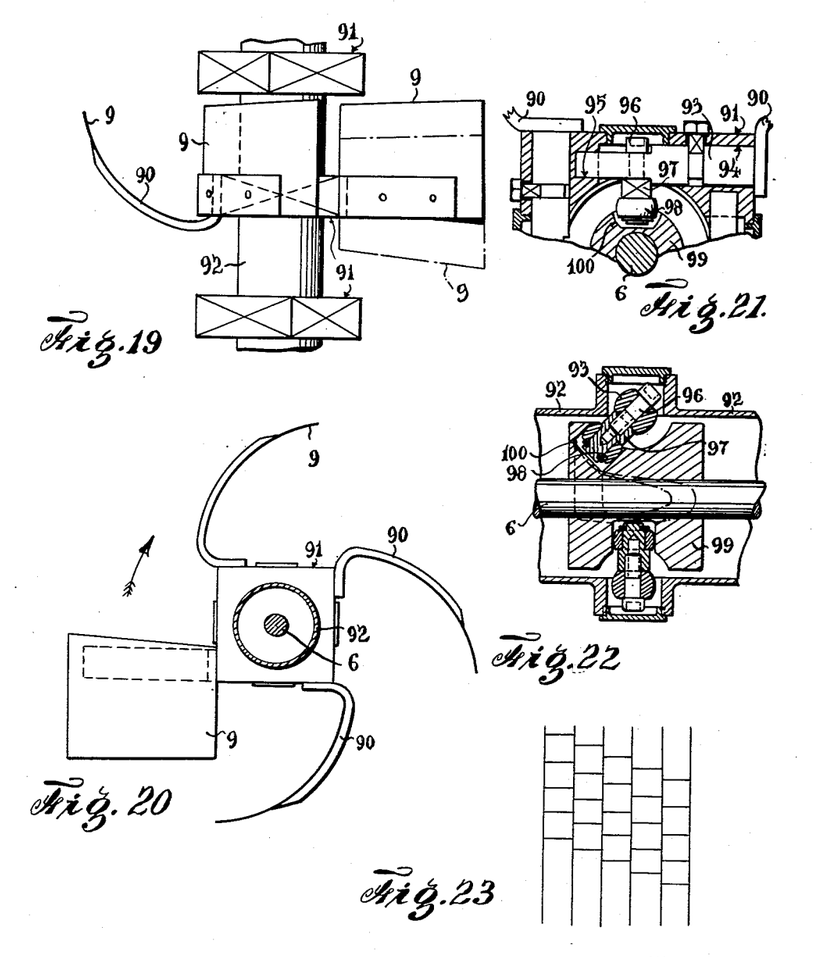
FIG. 19 shows a top view of a second embodiment of a shovel-bearing wheel having adjacent sets of tiltable shovel blades.
FIG. 20 is a side view of the shovel-bearing wheel shown in FIG. 22.
FIG. 21 is a part of a section of the mechanism for tilting the shovel blades taken in a plane perpendicular to the main shaft.
FIGURE 22 is another section of the mechanism shown in FIGURE 21, taken in a plane comprising the axis of the main shaft.
FIGURE 23 is a diagram showing a ploughing scheme with a machine according to the invention as embodied in the FIGURES 19 and 20.

A mechanism for tilting the shovel blades in a plough according to the FIGURES 19 and 20 will now be described with reference to the FIGURES 21 and 22. Each curved support 90 is fixed to a blade-bearing shaft 93 mounted in bores 94 and 95 of the casing 91 such that the different shafts 93 extend in a plane substantially perpendicular to the main shaft 5, of the shovel-bearing wheel. A part of the shafts 93 lying between the bearings 94 and 95 has been flattened on opposite sides. Through a hole in this part a bolt 96 keeps an arm 97 perpendicular to the shaft 93 in a direction towards the axis of the main shaft 5. A roller 98 is rotatably mounted on the end of the arm 97. Coaxially on the shaft 5 a cylindrical hub block 99 is fixed. This hub has a curved groove 100 around its circumference. The greater part of the course of the groove is such that the rollers 98 are kept in a position as indicated in the upper part of FIG. 25. This corresponds to a position of the blades 9 which might be called "shovel position." In a further part of the groove the direction of it changes such that after about a 45° rotation of the shovel-bearing wheel the shaft 93 is turned over at least 90°. This corresponds to a position of the blades 9 which might be called "delivery position." In the lower part of FIG. 22 the shaft 93 is shown half-way between the two aforesaid positions. The tilting movement of the blade could begin when the blade is in the position indicated at VIII in FIG. 3. This moment can be delayed if so required. In the last part of the groove the roller 98 is returned to its position as indicated in the upper part of FIG. 22. The blade belonging to that roller will then again be brought in the "shovel position."

In the embodiment shown in the FIGURES 19–22 each set of shovel blades has its own hub block steering the tilting movement of the blades. It is possible to have only one hub block with a master groove controlling the operation of the entire number of shovel blades in one machine.

The said principle of turning or tilting the shovel blade may also be applied to a double ditch digger provided with two shovel wheels throwing out the soil laterally in opposite directions. The shoveled-up soil then is turned aside on both sides of the ditch.

If the shovel blades are placed parallel to the lines describing a cylinder coaxial with the blade-bearing shaft, it becomes possible to transport the shoveled-up soil into the interior of the shovel-bearing wheel. From here the soil can be ejected laterally out of the wheel and be handled in any desired way. Thus, the soil may be sieved inside the shovel-bearing wheel, whereupon the soil is returned to the land, after having passed through the sieve. This method can be used advantageously when digging up potatoes or tuberous plants of other kinds. FIG. 15 shows such an embodiment of a shovel-bearing wheel. A flange 71 is fastened to the hub 70. The flange 71 carries a number of forks 72. These forks are attached to a ring 73 through which the potatoes will pass. A basket-shaped sieve 75 is suspended from the hub and remains in the correct position by aid or gravity. The shoveled-up soil falls into the sieve which can be vibrated during the movement of the machine in order to speed up sieving. Because of the tilted position of the sieve the potatoes and the like roll laterally out of the wheel through opening 74 and may be gathered easily. The speed of rotation of this wheel should be low so as to prevent throwing out the shoveled-up soil by centrifugal force. The width of the wheel can be substantially larger than the width of a shovel-bearing wheel with helicoidally shaped blades.

If the shovel-bearing wheels are equipped with helicoidal blades, it is necessary to have the tip of the blade which penetrates the soil positioned at that side of the shovel-bearing wheel which faces backward compared with the direction of movement of the machine. Thereby a furrow of maximum width is dug by overlapping the work of two adjacent shovel-bearing wheels.

Figure 16:
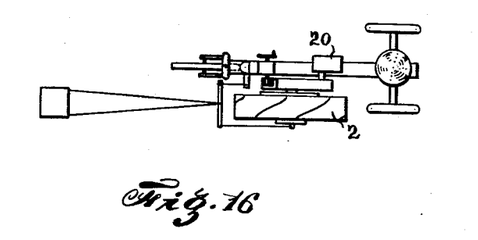
FIG. 16 is the top view of an embodiment of the machine according to the invention, wherein the machine is working as a self-propelled plough and is pulling a harrow.

FIG. 16 shows a plough having only one shovel-bearing wheel driven by the motor 20. In order to slow down the forward movement of the machine as it would result from the rotating speed of the shovel-bearing wheel, this plough pulls a harrow or similar tool which has a braking effect. At the same time the surface of the soil is leveled out.

Means (not shown) may also be provided on the body of the machine, moistening the soil-lifting sides of the shovel blades.

Figure 17:
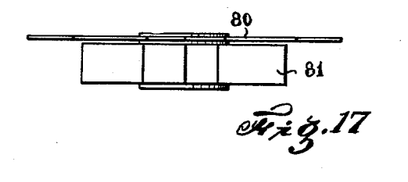
FIG. 17 is the top view of yet another embodiment of the shovel-bearing wheel which is also provided with a deep-cutting device, to be applied with the machine according to the invention.
Figure 18:
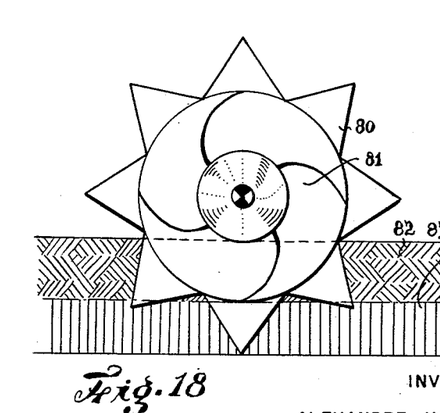
FIG. 18 is a side view of the embodiment of the shovel-bearing wheel shown in FIG. 16.

FIGS. 17 and 18 show a shovel-bearing wheel 31 to which is added a "star-shaped" wheel attached coaxially at the side of the former. This star wheel serves as deep-cutter for cutting up any impermeable layer of the subsoil. In FIG. 18 the top soil is indicated at 82 and the impermeable layer of the subsoil at 83.

It will be understood that this invention is susceptible to modification in order to adapt it to different usages and conditions and, accordingly, it is desired to comprehend such modifications within this invention as may fall within the scope of the appended claims.

I claim:

1. A machine for cultivating the soil by shoveling up and turning over the soil comprising a frame supported for movement over the ground surface, means for propelling said frame over said ground surface, a shovel-bearing wheel structure mounted for rotation on said frame, said wheel structure comprising a plurality of shovel blades whereby rotation of said wheel structure will successively bring said blades into cutting engagement with the ground, each of said blades being so shaped that a plane passed through said wheel structure perpendicularly to the axis of rotation thereof will intersect each blade to form an involute developed in the direction of rotation of said wheel structure and generated by a base circle coaxial with the axis of rotation of said wheel structure, and driving means for rotating said wheel structure in the direction corresponding to the direction of movement of the machine over the ground surface, at such a speed that the linear speed of the shovel blades at the ground surface has a small negative value with respect to the forward speed of the frame over the ground surface whereby each shovel blade is retracted from the undug soil ahead of it in the direction of movement of the frame as the blade is moved through the soil, the base circle of each of said involutes being smaller than a contact circle formed by the cross-section of a cylindrical surface connecting those points on said shovel blades which merely contact the soil without penetrating into the same.

2. A machine according to claim 1, wherein said shovel blades are tiltable.

3. A machine according to claim 2 wherein said shovel blades are tiltable over at least 90°.

4. A machine according to claim 3, further comprising turning and tilting shafts provided on said shovel blades substantially in planes perpendicular to the axis of rotation of said shovel-bearing wheel structure.

5. A machine according to claim 4, wherein said turning and tilting shafts are mounted in planes near one side of the end of said shovel blades fastened to said shovel-bearing wheel structure.

6. A machine according to claim 1, wherein a cutting device is mounted on said shovel bearing wheel structure for cutting an impermeable layer present in the subsoil.

7. A machine according to claim 1, wherein said shovel blades are fork-shaped and a sieve is provided inside said shovel-bearing wheel for sieving the soil shoveled up by said blades.

References Cited in the file of this patent

UNITED STATES PATENTS

| | | |
|---|---|---|
| 58,289 | Quinby et al. | Sept. 25, 1866 |
| 80,643 | Lynch | Aug. 4, 1868 |
| 101,710 | Chenoweth | Apr. 12, 1870 |
| 300,413 | Turchin | June 17, 1884 |
| 704,857 | Castelin | July 15, 1902 |
| 1,409,618 | Talbot | Mar. 14, 1922 |
| 1,433,961 | Marciandi | Oct. 31, 1922 |
| 1,878,442 | Hamshaw | Sept. 20, 1932 |
| 2,250,391 | Ober | July 21, 1941 |
| 2,375,137 | Rutishauser | May 1, 1945 |
| 2,750,859 | Smithburn | June 19, 1956 |